United States Patent
Kang (10) Patent No.: US 7,417,422 B2
(45) Date of Patent: Aug. 26, 2008

(54) ROTARY MANIPULATION TYPE INPUT APPARATUS

(75) Inventor: Eung-Cheon Kang, Hwaseong-si (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 74 days.

(21) Appl. No.: 11/546,879

(22) Filed: Oct. 13, 2006

(65) Prior Publication Data

US 2007/0222343 A1 Sep. 27, 2007

(30) Foreign Application Priority Data

Mar. 22, 2006 (KR) .................. 10-2006-0026018

(51) Int. Cl.
*G01B 7/30* (2006.01)
(52) U.S. Cl. .............. 324/207.25; 324/207.21; 324/207.2
(58) Field of Classification Search . 324/207.2–207.25, 324/173–174; 338/32 H, 32 R
See application file for complete search history.

(56) References Cited

U.S. PATENT DOCUMENTS

| | | | |
|---|---|---|---|
| 6,367,337 B1 * | 4/2002 | Schlabach | 73/862.331 |
| 6,396,259 B1 * | 5/2002 | Washeleski et al. | 324/207.22 |
| 6,836,039 B2 * | 12/2004 | Choi et al. | 310/81 |
| 6,864,679 B2 * | 3/2005 | Yokoji et al. | 324/207.11 |
| 7,095,198 B1 * | 8/2006 | O'Brien | 318/432 |
| 7,322,115 B2 * | 1/2008 | Besier et al. | 33/1 PT |
| 2003/0019113 A1 * | 1/2003 | Kofink et al. | 33/1 PT |
| 2005/0022617 A1 * | 2/2005 | Sano | 73/865.9 |
| 2007/0202935 A1 * | 8/2007 | Won et al. | 455/575.4 |

FOREIGN PATENT DOCUMENTS

JP 03244012 A * 10/1991
JP 2003-281972 10/2003

* cited by examiner

*Primary Examiner*—Jay M Patidar (57) ABSTRACT

A rotary manipulation type input apparatus includes: a rotatable wheel; a first magnet joined to a side of the wheel for cooperation with the wheel and magnetized to have N- and S-poles; a detection element, positioned to face the first magnet, for detecting changes in magnetism; a second magnet positioned to face the first magnet; a printed circuit board, on which the detection element and the second magnet are mounted; a base, to which the printed circuit board is secured; and a holder joined to the base and interposed between the wheel and the base to rotatably support the wheel. Here, the second magnet is an electromagnet, and the printed circuit board has a circuit for regulating the amount of current delivered to the second magnet. The apparatus allows the user to decide whether or not to create click sensations and to regulate the magnitude of the click sensations.

9 Claims, 9 Drawing Sheets

ROTARY MANIPULATION TYPE INPUT APPARATUS

CROSS-REFERENCE TO RELATED APPLICATIONS

This application claims the benefit of Korean Patent Application No. 2006-0026018 filed with the Korean Intellectual Property Office on Mar. 22, 2006, the disclosure of which is incorporated herein by reference in its entirety.

BACKGROUND

1. Technical Field

The present invention relates to a rotary input apparatus.

2. Description of the Related Art

In general, a mobile terminal has the numbers 0-9 and the symbols * and # on a keypad of 12 keys. In addition to the numbers, there are also alphabet letters as well as consonants and vowels of Korean letters marked on such a keypad, to enable the input of information including numbers and letters. Recently, there are also navigation keys formed above the keypad equipped with a variety of functions such as phone number search, writing and managing text messages, and connecting to the Internet, etc. There are various forms of navigation keys, such as button types and rotary types, etc., but the use of rotary input apparatus is currently increasing, as they enable various functions such as menu browsing, etc.

Rotary input apparatus are used in televisions, camcorders, and PDA's (personal digital assistants), etc., as input apparatus in the form of rotary switches, rotary encoders, and rotary volume dials, etc.

In such rotary input apparatus, rotating by a particular angle can transfer a certain degree of vibration periodically via the user's hand, etc., and the sensation of this vibration is referred to as a click sensation. Clicks transfer a certain vibration to the user, at the rotation of a rotary input apparatus, thereby allowing the user to recognize whether or not a rotation has been made on the rotary input apparatus and to recognize the rotation angle, etc. Thus, click sensations not only increase the convenience of using a rotary input apparatus, but also allow the user to operate the rotary input apparatus more precisely.

An example of a conventional rotary input apparatus that generates click sensations include, first, a rotary input apparatus for generating click sensations consisting of a rotary member having a plurality of concavo-convex portions, a click member for engagement with and disengagement from the concavo-convex portions, a biasing member for urging the click member elastically in a direction towards the concavo-convex portions, and a holding member for holding the biasing member.

A second example includes a rotary input apparatus consisting of a rotor capable of free rotational motion, cam seats provided in the rotor and having concavo-convex portions, clicking members to be put in slide contact with the cam seats, and a holding member to hold the clicking members, where the holding member is furnished with a plurality of holding parts for holding the clicking members. There are a plurality of different concavo-convex portions formed so that different clicking sensations are obtained when the cam seats are in sliding contact with the clicking members.

Such conventional rotary input apparatus for generating click sensations have grooves such as the concavo-convex portions or the cam seats, where click sensations are created when click members are caught on and disengaged from these grooves. However, in rotary input apparatus thus comprised, the fact that click sensations are created even when they are not desired by the user presents an inconvenience in usage. Also, since click sensations are created as the click members are caught on and disengaged from concavo-convex portions or cam seats of constant sizes, the magnitude of the click sensations cannot be regulated.

Further, in conventional rotary input apparatus, because the click members are caught on and disengaged from concavo-convex portions or cam seats, not only is there a problem of damage on the click members due to friction, etc., but also the composition is made complicated, due to the requirement of a flat spring, etc., for providing elastic force by which the click members always press against the cam seats or concavo-convex portions.

SUMMARY

The present invention aims to provide a rotary input apparatus with which the user can decide whether or not to create click sensations and can regulate the magnitude of the click sensations.

The invention also aims to provide a rotary input apparatus having a simple composition and excellent durability.

One aspect of the invention provides a rotary input apparatus comprising a rotatable wheel, a first magnet joined to a side of the wheel for cooperation with the wheel and magnetized to have alternating N- and S-poles, a detection element positioned to face the first magnet for detecting changes in magnetism of the first magnet, a second magnet positioned to face the first magnet and magnetized to have alternating N- and S-poles in correspondence with the first magnet, a printed circuit board on which are mounted the detection element and the second magnet, a base to which the printed circuit board is secured, and a holder joined to the base and interposed between the wheel and the base to rotatably support the wheel.

The second magnet may preferably be an electromagnet operated by receiving an electrical current from a circuit formed on the printed circuit board, and on the printed circuit board may be formed a circuit for regulating the amount of the electrical current delivered to the second magnet, or a circuit for modifying the direction of the electrical current delivered to the second magnet.

The first magnet may be joined in a circumferential shape along the perimeter portion of a side of the wheel, and multiple second magnets may be mounted on the printed circuit board in correspondence with the first magnet. It may be preferable for the plurality of second magnets to be arranged in constant intervals.

Preferably, the number of N-poles or the number of S-poles on the first magnet may be an integer multiple of the number of second magnets. The second magnet may be positioned to face an N-pole or an S-pole of the first magnet. Some of the plurality of second magnets may be positioned to face N- or S-poles of the first magnet, and some of the plurality of second magnets may be positioned to face the boundaries between N- and S-poles of the first magnet.

The holder may comprise a body portion positioned in contact with the wheel, an inclination portion extending in a predetermined angle from the body portion, and a securing portion extending from the inclination portion and joined to the base. The inclination portion may comprise a support hole for holding at least a portion of the detection element or the second magnet.

There may be a plurality of push protrusions formed on a side of the holder, protruding in the direction of the printed circuit board, and there may be dome buttons joined to the printed circuit board to be pressed by the push protrusions.

Additional aspects and advantages of the present invention will be set forth in part in the description which follows and in part will be obvious from the description, or may be learned by practice of the invention.

DETAILED DESCRIPTION

Below, embodiments of the rotary input apparatus according to the invention will be described in more detail with reference to the accompanying drawings. In the description with reference to the accompanying drawings, those components are rendered the same reference number that are the same or are in correspondence regardless of the figure number, and redundant explanations are omitted.

Referring to FIGS. 1 to 4, a rotary input apparatus according to an embodiment of the invention comprises a rotatably joined wheel 11, a washer 25 which secures the wheel 11 to a holder, a center key 29 joined at the center of the wheel 11, a ring-shaped magnet 13 secured to the bottom of the wheel 11 which rotates together with the wheel 11, the holder 15 joined to the upper surface of a base 39 which rotatably supports the wheel 11, a printed circuit board 31 secured to the upper surface of the base 39, Hall sensors 35 positioned in grooves of the printed circuit board 31 which are detection elements for sensing the rotation of the magnet 13, and an electromagnet 45 having an N- or S-pole mounted on the printed circuit board 31. According to this embodiment, a certain click sensation is created due to the interaction between the rotary magnet 13 and the electromagnet 45 when the wheel 11 is rotated, to provide a better tactile feel. Also, with the rotary input apparatus according to this embodiment, the user can determine whether or not a click sensation is to be created and can regulate its magnitude, by allowing or disallowing electrical flow delivered to the electromagnet and by controlling the magnitude of the electrical flow. Also, the rotary input apparatus according to this embodiment is a structure for generating click sensations, and as it is equipped with an electromagnet mounted on the printed circuit board, it is characterized by both a simple composition and excellent durability.

The wheel 11 is generally shaped as a circular plate, with an insertion hole 14 formed in the center through which the center key 29 may be inserted. The wheel 11 has a plurality of securing protrusions 12 adjacent to the insertion hole 14 that protrude downwards. As the securing protrusions 12 are inserted into the rotation holes 27 of the washer 25, the wheel 11 is rotatably secured to the holder 15. On the bottom surface of the wheel 11 is secured the magnet 13, which is magnetized to have multiple poles. The wheel 11 is rotated together with the magnet 13 by user operation, whereby a variety of inputs are made as the Hall sensors 35 sense the rotation angle, direction, and speed, etc., of the magnet 13. As the electromagnet 45 periodically provides an attraction force with respect to the magnet 13 rotating together with the wheel 11, certain click sensations are generated. Also, a portion may be pressed by the user, so that a push protrusion formed on the reverse side of the holder 15 presses the upper surface of a dome button 33 to activate a separate function.

Figure 3:
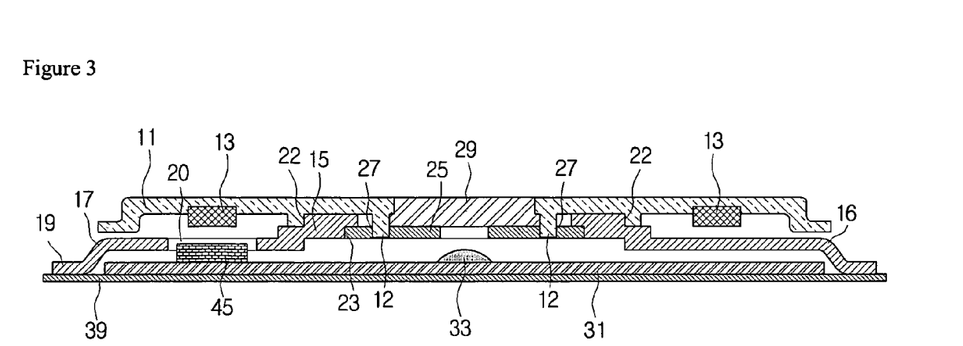
FIG. 3 is a cross-sectional view across line I-I' of FIG. 2.
Figure 4:
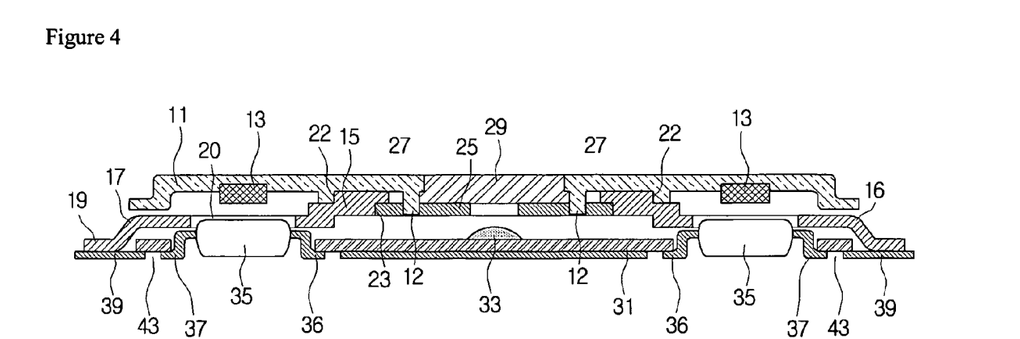
FIG. 4 is a cross-sectional view across line II-II' of FIG. 2.

The securing protrusions 12, as illustrated in FIG. 3 or 4, are inserted through the center hole 21 of the holder 15 and the rotation holes 27 of the washer 25, with the ends processed such that they are not detached from the rotation holes 27. The washer 25 is inserted and secured onto the center of the holder 15, whereby the wheel 11 is secured to the holder 15. The central angles of the rotation holes 27 of the washer 25, through which the securing protrusions 12 are inserted, define the angle by which the wheel 11 is able to rotate.

The magnet 13 is attached to the bottom surface of the wheel 11 to be rotated together with the wheel 11, and such rotation of the magnet 13 is sensed by the Hall sensors 35 for an input based on the rotation angle. When the magnet 13 is rotated, an attraction is generated by the electromagnet 45 having an N- or S-pole, whereby a click sensation is generated. The magnet 13 has the shape of a ring magnetized to have a plurality of alternating N- and S-poles, and the Hall sensors 35 are able to detect the rotation angle, direction, and speed of the wheel 11 according to the changes in N- and S-poles above the Hall sensors 35.

The holder 15 is secured to one side of the base 39 and rotatably supports the wheel 11. The holder 15 may be made of metal, such as stainless steel, etc., so that when the particular force applied on the wheel 11 is removed, the wheel 11 is returned to its original position due to the elasticity of the holder 15 itself. The holder 15 may be formed by press processing, etc. Of course, the holder 15 may also be formed by plastics, etc., that are high in elasticity. The holder 15 includes a ring-shaped body portion 18, and a support portion 16 protruding from the perimeter of the body portion 18 and secured to a side of the base 39. The body portion 18 has a center hole 21 in the middle, and the support portion 16 protruding in four directions around the center hole 21 comprises an inclination portion 17 protruding downwards in a particular inclination, and a securing portion 19 extending horizontally from the end of the inclination portion 17.

The inclination portion 17 protrudes outwards and connects the body portion 18 and the securing portion 19. Since the inclination portion 17 is formed by metal, etc., having elasticity, when an external force applied on the holder 15 is removed, the holder 15 is returned to its original position by means of the elasticity of the inclination portion 17. Thus, even when a particular portion of the wheel 11 is pressed so that the wheel i 1 becomes tilted, this elasticity allows it to be restored to its original position. The securing portion 19 extends from the end of the inclination portion 17 and is secured to the upper surface of the base 39 to secure the holder 15. The securing portion 19 may be secured to the base 39 by means of adhesive or tape, etc.

Since the holder 15 is secured directly to a side of the base 39 by means of adhesive, etc., the rotary input apparatus according to this embodiment has superior endurance to external impact. Also, the elasticity of the holder 15, which is formed of metal, allows not only the holder 15 itself but also the wheel 11 to be restored to their original positions, to provide a better tactile feel.

In the support portion 16 are formed support portion holes 20. As illustrated in FIG. 3 or 4, portions of the Hall sensors 35 and the electromagnet 45 may be positioned in the support portion holes 20. Also, the body portion 18 has ledges 23 formed adjacent to the center hole 21.

Figure 2:
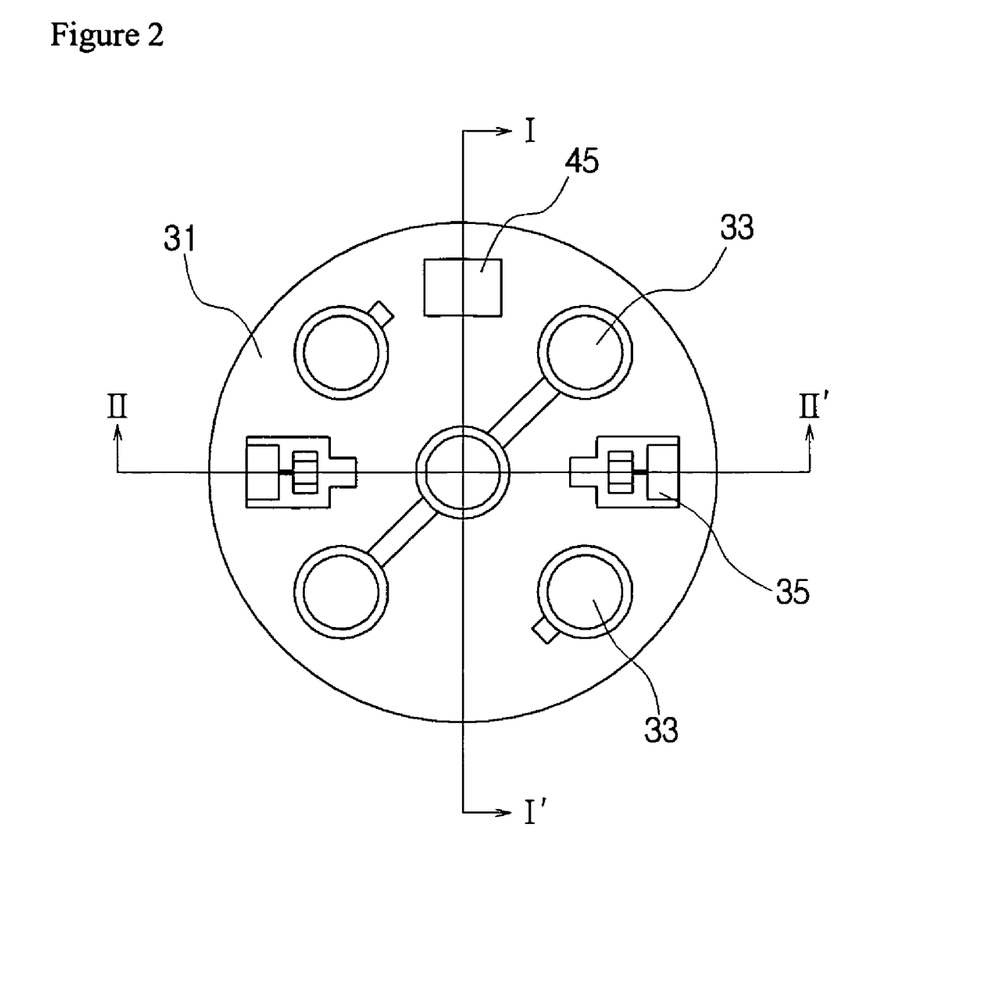
FIG. 2 is a plan view illustrating the printed circuit board of a rotary input apparatus according to an embodiment of the invention.

The support portion holes 20 in the support portion 16 are formed to correspond with the Hall sensors 35 and electromagnet 45 mounted on the printed circuit board 31, and as illustrated in FIG. 3 or 4, hold portions of the Hall sensors 35 and electromagnet 45. The center hole 21 is formed in the center of the holder 15. Also, the wheel 11 is rotatably inserted onto a perimeter 22 forming the center hole 21, to prevent the wheel 11 from becoming detached. The ledges 23, as illustrated in FIG. 2, are formed adjacent to the center hole 21. The washer 25 is inserted and secured onto the ledges 23.

Figure 1:
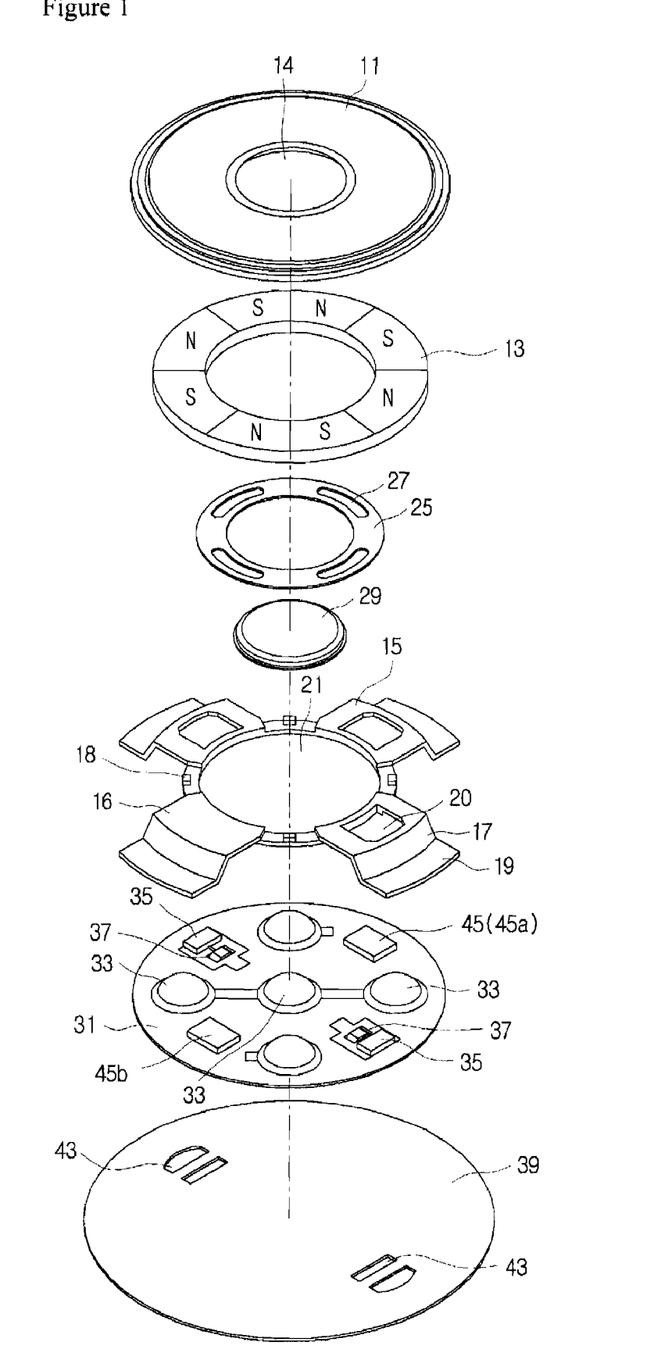
FIG. 1 is an exploded perspective view of a rotary input apparatus according to an embodiment of the invention.

As illustrated in FIG. 1, the washer 25 is generally shaped as a donut, with a plurality of rotation holes 27 formed in certain intervals along the ring. The washer 25 is inserted and secured onto the ledges 23 to define the angle by which the wheel 11 is able to rotate. While there are four arc-shaped rotation holes 27 illustrated in this embodiment, the invention is not thus limited, and it is to be appreciated that the number and central angles of the rotation holes 27 may be changed according to design considerations. For example, one or two rotation holes 27 formed along the ring of the washer 25 with a central angle of 180° or 360° may be used for the rotation holes 27.

The center key 29 is inserted through the insertion hole 14 of the wheel 11. The center key 29 is pressed by the user to perform a particular function, examples of which include connecting to the Internet or receiving DMB (Digital Multimedia Broadcasting), etc.

As illustrated in FIG. 2, the printed circuit board 31 has the shape of a circular plate in correspondence with the base 39, with a plurality of dome buttons 33 formed on one side in correspondence with the push protrusions formed on the reverse side of the holder 15, and with the Hall sensors 35 and electromagnet 45 mounted facing the magnet 13. Also, there are receiving holes 37 formed on the printed circuit board 31 in which at least portions of the Hall sensors 35 may be inserted. The printed circuit board 31 is formed with a diameter somewhat shorter than the diameter of the base 39, in order to allow a sufficient area where the securing portion 19 of the holder 15 may be secured.

The printed circuit board 31 supplies an electrical current having a certain magnitude and direction to the electromagnet 45, and this electrical current allows the electromagnet 45 to have an N- or S-pole. Since the printed circuit board 31 is able to block the electrical current inputted to the electromagnet 45, the user may change the settings so that click sensations are not generated during the rotation of the wheel 11. Also, the printed circuit board 31 can regulate the magnitude of the electrical current delivered to the electromagnet 45, thereby regulating the magnitude of the click sensations.

The dome buttons 33 are pressed by push protrusions (not shown) formed on the reverse side of the holder 15 to perform separate functions. While in this embodiment the dome buttons 33 are illustrated as being pressed by means of the wheel 11, the invention is not thus limited, and any composition may be used in which certain pressing performs separate functions. For example, pressure sensors or contact sensors may also be used instead of the dome buttons 33.

The receiving holes 37 are formed on the printed circuit board 31 in correspondence with the support portion holes 20 of the holder 15, and as illustrated in FIGS. 3 and 4, at least portions of the Hall sensors 35 are positioned in the receiving holes 37. Thus, compared to the case of mounting Hall sensors 35 on the upper surface of the printed circuit board 31, the thickness of the input device in the present embodiment may be reduced by the by the thickness of a receiving hole 37.

The detection element may be a Hall sensor (Hall effect sensor), which is a silicon semiconductor using the effect of electromotive forces being generated when electrons experience the Lorentz force in a magnetic field and their direction is curved. The Hall sensors generate electromotive forces that are proportional to the rotation of the magnet 13 attached to the wheel 11, which are transferred via the printed circuit board 31 to an outside control unit (not shown).

Of course, the detection element is not limited to Hall sensors, and any element may be used which can detect the rotation of the magnet 13. For example, MR (magneto-resistive) sensors or GMR (giant magneto-resistive) sensors may be used for the detection element. An MR sensor or a GMR sensor is an element of which the resistance value is changed according to changes in the magnetic field, and utilizes the property that electromagnetic forces curve and elongate the carrier path in a solid to change the resistance. Not only are MR sensors or GMR sensors small in size with high signal levels, but also they have excellent sensitivity to allow operation in low-level magnetic fields, and they are also superior in terms of temperature stability.

When the detection element consists of Hall sensors 35, the Hall sensors 35 are secured to the printed circuit board 31 by leads 36, where the leads 36 are inserted through the insertion holes 43 of the base 39 and secured to the reverse side of the printed circuit board 31.

The base 39, as illustrated in FIG. 1, has the shape of a circular plate, and rotatably supports the holder 15 and the wheel 11. The diameter of the base 39 is formed to be somewhat longer than that of the printed circuit board 31. Also, insertion holes 43 are formed on the base 39 in correspondence with the receiving holes 37 of the printed circuit board 31. As illustrated in FIG. 3, portions of the Hall sensors 35 are positioned in the insertion holes 43, whereby the thickness of the rotary input apparatus may further be reduced by the thickness of the insertion holes 43.

The electromagnet 45 is mounted on the printed circuit board 31 and generates an N- or S-pole by means of the electrical current inputted via the printed circuit board 31. The polarity of the electromagnet 45 thus generated creates certain click sensations by interacting with the N- or S-poles of the magnet 13. The allowing or disallowing of an electrical current inputted to the electromagnet 45, as well as its magnitude, are controlled by the printed circuit board 31.

Figure 5:
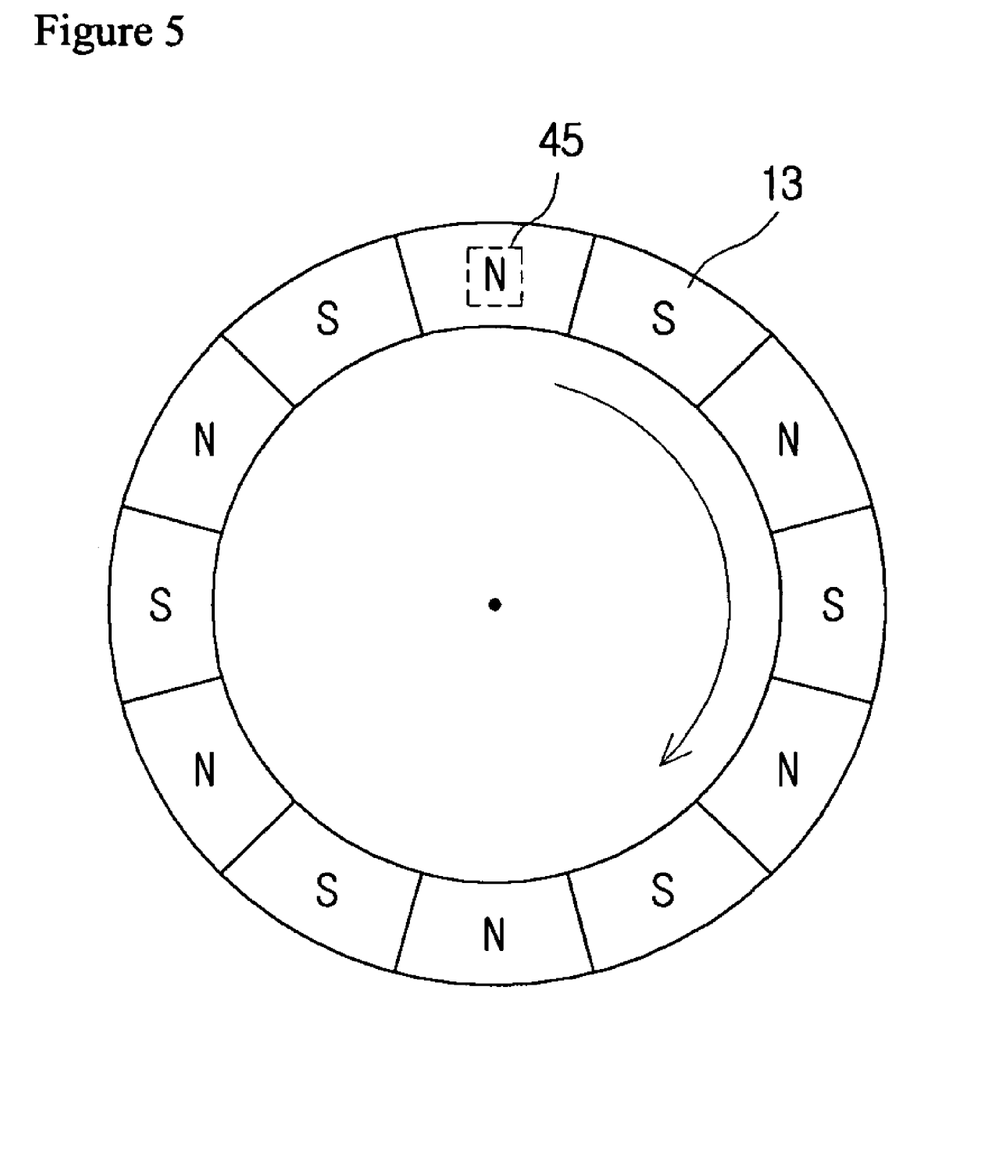
FIG. 5 is a schematic diagram illustrating an electromagnet facing an N-pole in a rotary input apparatus according to an embodiment of the invention.

Referring to FIG. 5, there are six pairs of alternating N- and S-poles on the magnet 13 according to an embodiment of the invention, and there is one electromagnet 45 on the printed circuit board 31 facing an N- or S-pole of the magnet 13. Here, if the electromagnet 45 has an S-pole, there is attraction between the magnet 13 and the electromagnet 45. Due to this attraction between the magnet 13 and the electromagnet 45, a click sensation is generated when the magnet is rotated. Under this circumstance, the user applies a torque sufficient to overcome this attraction, and in the process of overcoming the attraction between the magnet 13 and the electromagnet 45, the user is made to feel a click sensation.

When the electromagnet 45 is made to face an S-pole of the magnet 13 due to the rotation of the magnet 13, the repulsion generated and the attraction to the surrounding N-poles allow easier rotation in the clockwise or counterclockwise direction. Since, in the embodiment illustrated in FIG. 5, the N- and S-poles are arranged in 30° angles and the minimum angle between an N-pole (or S-pole) and another N-pole (or S-pole) is 60°, six click sensations are created during 1 rotation of the wheel 11.

Figure 6A:
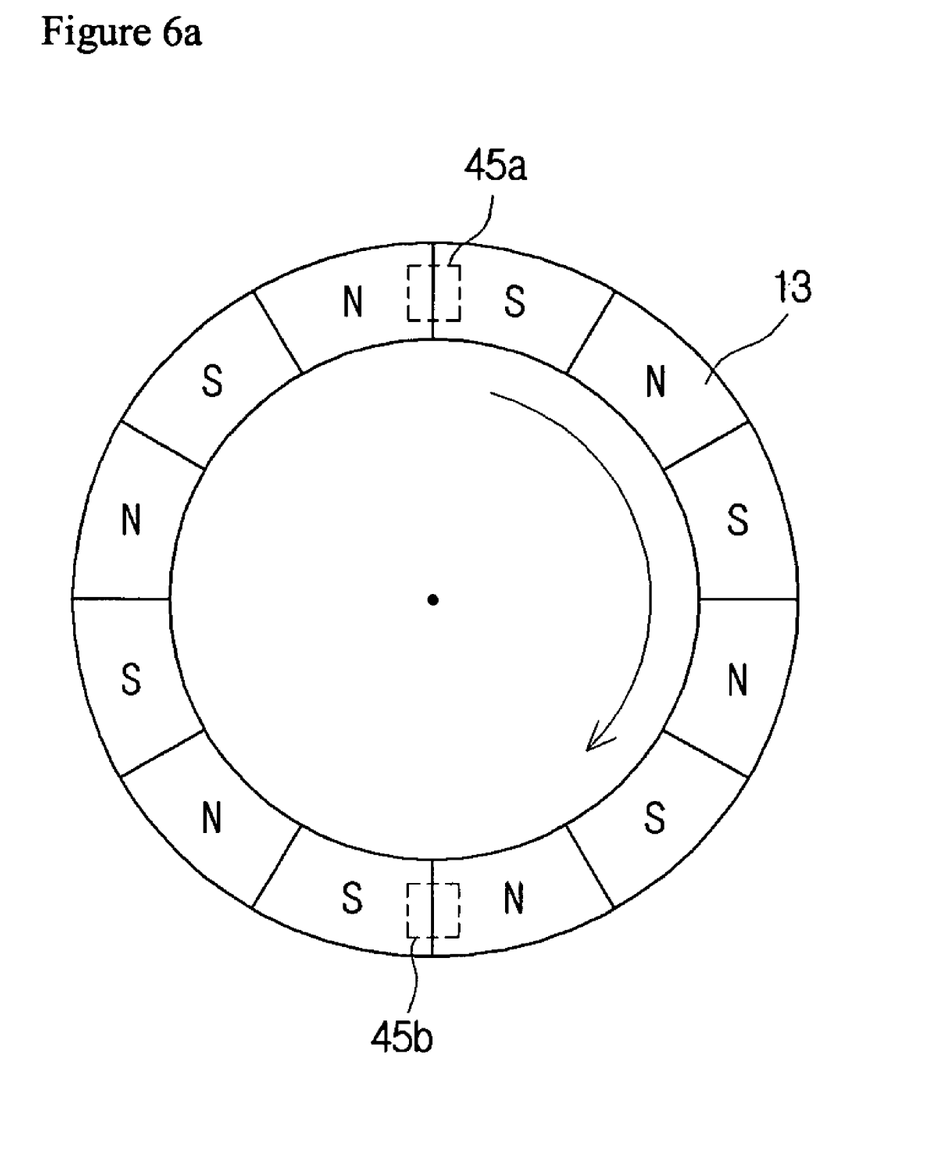
FIGS. 6a and 6b are schematic diagrams illustrating electromagnets and a magnet facing each other in a rotary input apparatus according to an embodiment of the invention.
Figure 6B:
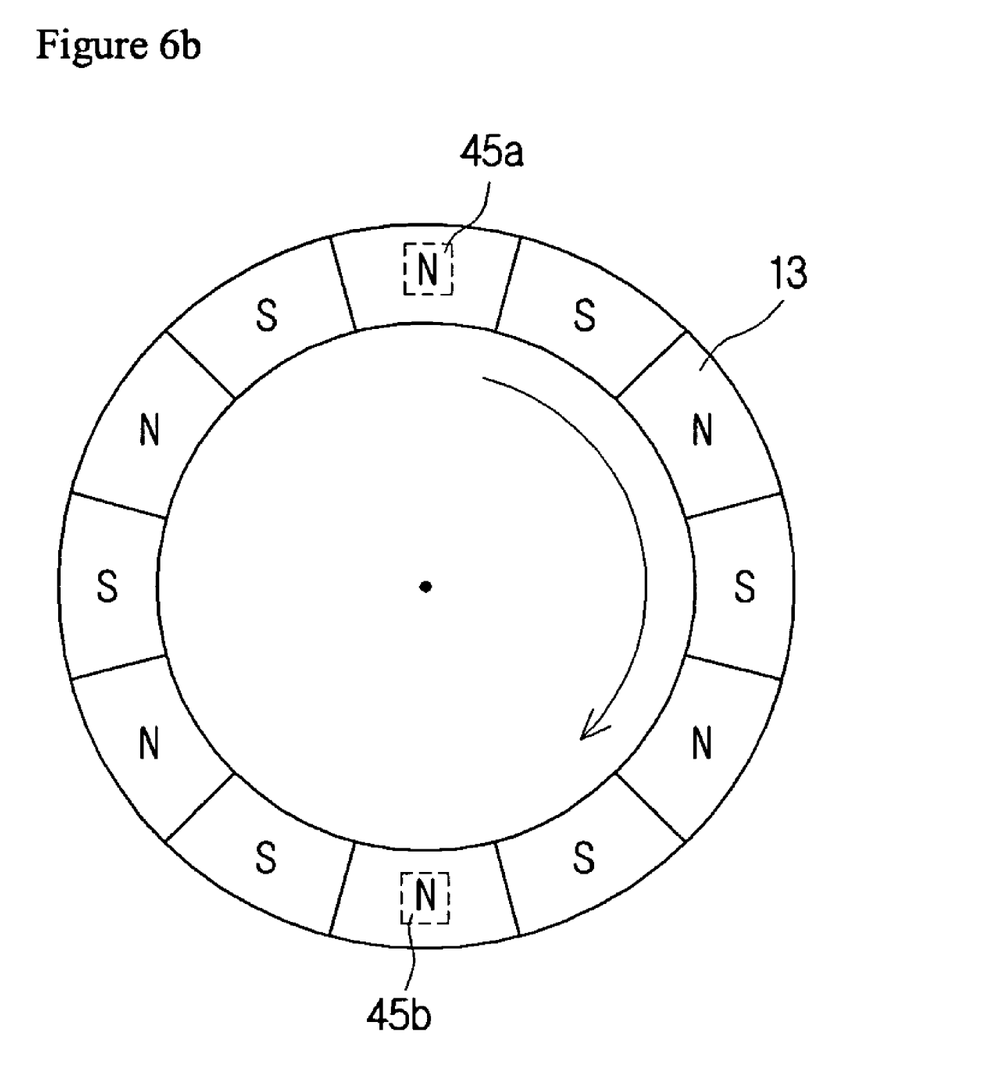

Although one electromagnet is illustrated in FIG. 5, the invention is not thus limited, and as illustrated in FIGS. 6a and 6b, two or more electromagnets may be used.

As illustrated in FIG. 6a, when the electromagnets 45a, 45b are positioned at the boundaries between N- and S-poles, the rotation of the magnet 13 is made easier due to the attraction of the S-pole of the electromagnet 45a to the N-pole of the magnet 13 and the repulsion to the S-pole of the magnet 13. Also, as illustrated in FIG. 6b, when the rotation of the magnet 13 causes the electromagnets 45a, 45b to each be positioned at an N-pole, there are attractive forces operating between the electromagnets 45a, 45b and the magnet 13, and in the process of overcoming such attractive forces, the user is provided with a click sensation.

In the rotary input apparatus according to the present embodiment, since the electromagnets 45a, 45b are arranged in 180° intervals, a click sensation is generated when the wheel and magnet are rotated 60°, similarly to the rotary input apparatus described with reference to FIG. 5, where the two electromagnets enable stronger click sensations and greater stability.

Figure 7A:
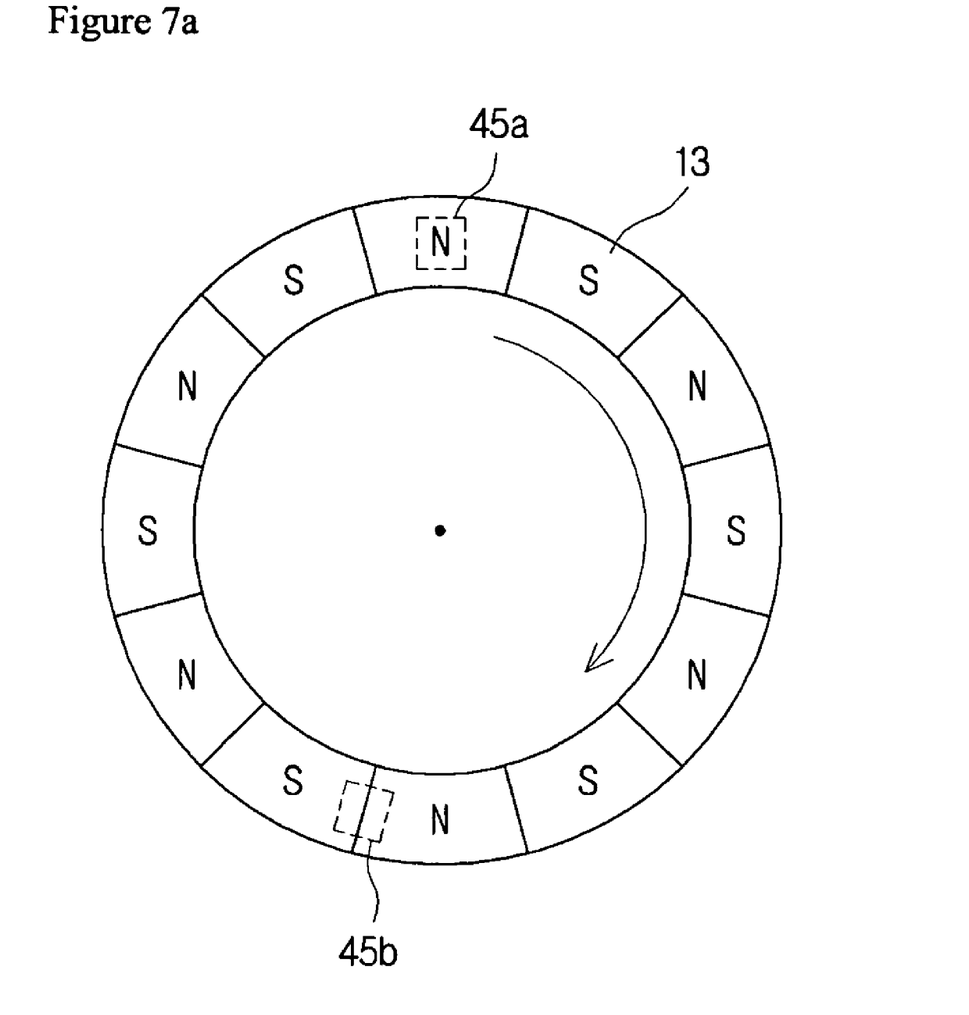
FIG. 7a is a schematic diagram illustrating electromagnets and a magnet facing each other in a rotary input apparatus according to another embodiment of the invention.
Figure 7B:
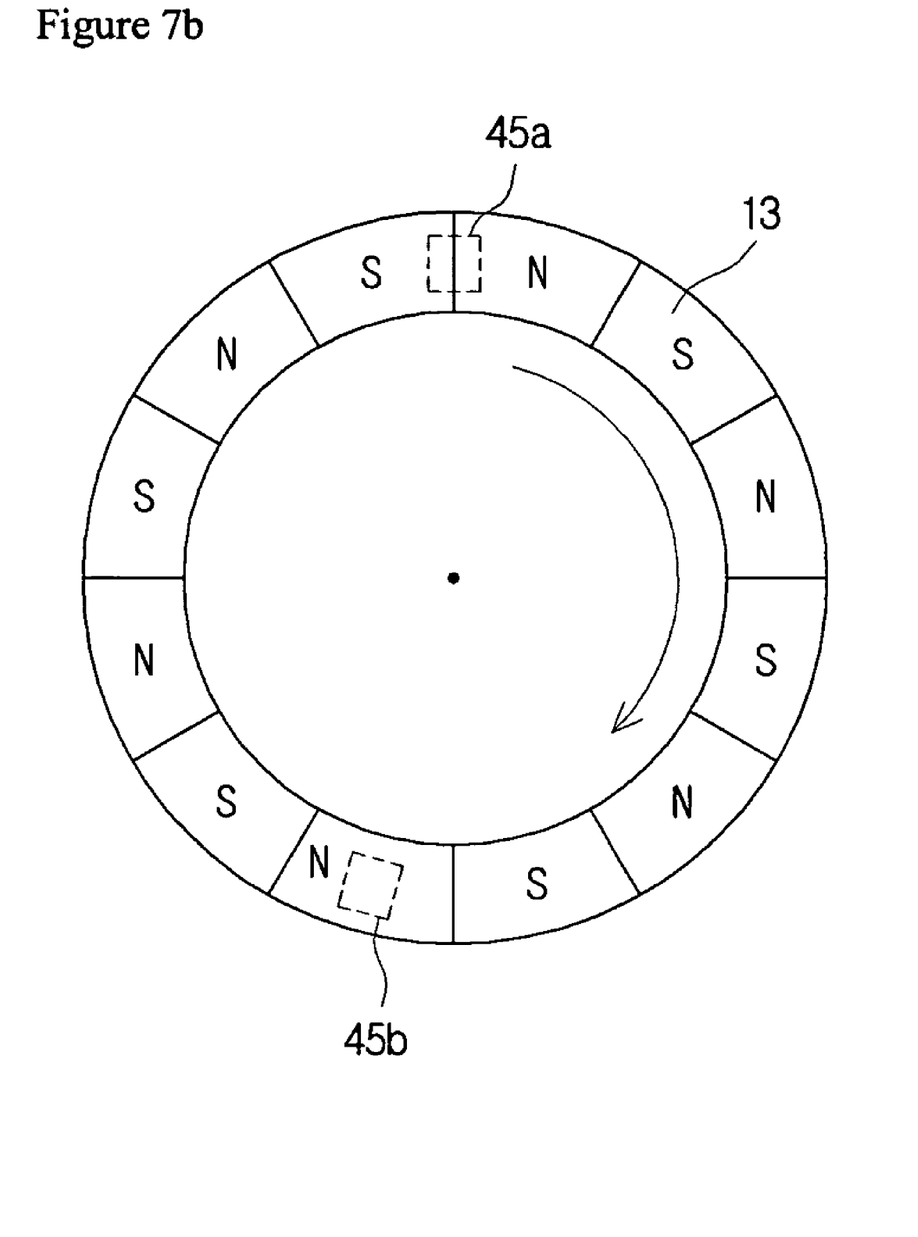
FIG. 7b is a schematic diagram illustrating the rotary input apparatus of FIG. 7a after the magnet has been rotated.

In FIGS. 7a and 7b, one electromagnet 45a is positioned facing an N-pole of the magnet 13, while the other electromagnet 45b is positioned on the boundary between an N- and S-pole. For convenience, it will be assumed below that the first electromagnet 45a and the second electromagnet 45b each have an S-pole.

Referring to FIG. 7a, there is an attraction between the first electromagnet 45a and an N-pole of the magnet 13, and this attraction causes the magnet 13 to stay still and not rotate, and also creates a click sensation when it is rotated by the user. Also, the second electromagnet 45b is positioned at the boundary between an N- and S-pole, where there is an attraction of the second electromagnet 45b to the N-pole and a repulsion to the S-pole, so that a torque is provided that tends toward rotating the magnet 13 in the clockwise direction. As this torque is small compared to the attraction between the first electromagnet 45a and the N-pole, the magnet 13 is kept still and is not rotated.

When the user wishes to apply a certain torque on the wheel 11 to rotate the magnet 13 clockwise, the user provides a torque of a strength sufficient to overcome the attraction between the first electromagnet 45a and the N-pole of the magnet 13, in the process of which the second electromagnet 45b positioned at the boundary between an N- and S-pole allows the magnet 13 to be rotated more easily.

In addition, as illustrated in FIG. 7b, the rotation of the magnet 13 causes the first electromagnet 45a to be positioned at the boundary between an N- and S-pole, and causes the second electromagnet 45b to be positioned facing an N-pole. Thus, an attraction is generated between the second electromagnet 45b and the N-pole of the magnet 13, while the first electromagnet 45a is positioned at the boundary between the N- and S-pole to provide a force that tends toward rotating the magnet 13 clockwise. Therefore, according to the embodiment illustrated in FIGS. 7a and 7b, a click sensation is generated every time the magnet 13 is rotated 15°.

While a magnet 13 having six pairs of N- and S-poles was illustrated above, the invention is not thus limited, and any magnet having one or more pairs of N- and S-poles may also be used. It should be noted, however, that a greater number of N- and S-poles are needed to decrease the rotation angle required to create a click sensation.

Below, a description will be given of the operation of a rotary input apparatus according to the present embodiment.

When a rotational force is applied by a user on an outer side of the center key 29, the wheel 11 is rotated while inserted onto the perimeter 22 of the holder 15, which causes the magnet 13 to rotate together with the wheel 11. As the magnet 13 has a multiple number of alternately magnetized N- and S-poles, the Hall sensors 35 can sense the changes in poles due to the rotation of the magnet 13, to recognize the rotation direction, speed, and angle of the wheel 11. The Hall sensors 35 generate output signals corresponding to the rotation direction, rotation angle, and rotation speed of the wheel 11, which are transmitted via the printed circuit board 31 to an outside control unit, and the control unit identifies the output signals to perform an input corresponding to the rotation of the wheel 11.

Also, when an outer side of the center key 29 is pressed by a user, the wheel 11 is tilted in one direction while elastically supported by the holder 15, which causes the push protrusions (not shown) formed on the reverse side of the holder 15 to press the dome buttons 33. This allows each of the dome buttons 33 positioned on the printed circuit board 31 to perform its own function. For example, in the input apparatus illustrated in FIGS. 1 to 3, there are four dome buttons 33 in equal intervals that can be pressed by the push protrusions, where each dome button 33 may function as a hot key for launching a text message function, searching phone numbers, connecting to the Internet, or receiving satellite broadcasts, etc.

In addition, the center key 29 may also perform a separate function when pressed by a user.

According to embodiments of the invention as set forth above, a rotary input apparatus is provided with which the user can decide whether or not to create click sensations and can regulate the magnitude of the click sensations, where the rotary input apparatus has a simple composition and yet has excellent durability.

While the above description has pointed out novel features of the invention as applied to the embodiments disclosed above, it is to be construed that various permutations and modifications are included within the scope of the present invention.

What is claimed is:

1. A rotary manipulation type input apparatus, comprising:
   a rotatable wheel;
   a first magnet joined to a side of the wheel for cooperation with the wheel and magnetized to have alternating N- and S-poles;
   a detection element, positioned to face the first magnet, for detecting changes in magnetism of the first magnet;
   a second magnet positioned to face the first magnet;
   a printed circuit board having the detection element and the second magnet mounted thereon;
   a base having the printed circuit board secured thereto; and
   a holder joined to the base and interposed between the wheel and the base to rotatably support the wheel, wherein
   the second magnet is an electromagnet, and
   the printed circuit board has a circuit formed thereon for regulating the amount of the electrical current delivered to the second magnet.

2. The rotary manipulation type input apparatus of claim 1, wherein the printed circuit board has a circuit formed thereon for modifying the direction of the electrical current delivered to the second magnet.

3. The rotary manipulation type input apparatus of claim 1, wherein the first magnet is joined in a circumferential shape along a perimeter portion of a side of the wheel, and a plurality of the second magnets are mounted on the printed circuit board in correspondence with the first magnet.

4. The rotary manipulation type input apparatus of claim 3, wherein the plurality of second magnets are arranged in constant intervals.

5. The rotary manipulation type input apparatus of claim 3, wherein the number of N-poles or the number of S-poles on the first magnet is an integer multiple of the number of the second magnets.

6. The rotary manipulation type input apparatus of claim 3, wherein the second magnet is positioned to face an N-pole or an S-pole of the first magnet.

7. The rotary manipulation type input apparatus of claim 3, wherein at least one of the second magnets is positioned to face N- or S-poles of the first magnet, and at least one of the other second magnets is positioned to face boundaries between N- and S-poles of the first magnet.

8. The rotary manipulation type input apparatus of claim 1, wherein the holder comprises a body portion positioned in contact with the wheel, an inclination portion extending in a predetermined angle from the body portion, and a securing portion extending from the inclination portion and joined to the base.

9. The rotary manipulation type input apparatus of claim 8, wherein the inclination portion comprises a support hole for holding at least a portion of the detection element or the second magnet.

* * * * *